US008731717B2

(12) United States Patent
Luce et al.

(10) Patent No.: US 8,731,717 B2
(45) Date of Patent: May 20, 2014

(54) METHODS FOR MANIPULATING CUTTING ELEMENTS FOR EARTH-BORING DRILL BITS AND TOOLS

(71) Applicants: David Keith Luce, Splendora, TX (US); Sean W. Wirth, Spring, TX (US); Alan J. Massey, Houston, TX (US); Crystal A. Parrot, Helotes, TX (US)

(72) Inventors: David Keith Luce, Splendora, TX (US); Sean W. Wirth, Spring, TX (US); Alan J. Massey, Houston, TX (US); Crystal A. Parrot, Helotes, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 13/741,731

(22) Filed: Jan. 15, 2013

(65) Prior Publication Data

US 2013/0197686 A1     Aug. 1, 2013

Related U.S. Application Data

(62) Division of application No. 12/370,516, filed on Feb. 12, 2009, now Pat. No. 8,355,815.

(51) Int. Cl.
| | |
|---|---|
| *G06F 19/00* | (2011.01) |
| *E21B 10/00* | (2006.01) |
| *E21B 10/02* | (2006.01) |
| *E21B 10/08* | (2006.01) |
| *E21B 10/26* | (2006.01) |
| *E21B 10/42* | (2006.01) |
| *E21B 10/43* | (2006.01) |
| *E21B 10/62* | (2006.01) |
| *B21B 23/00* | (2006.01) |

(52) U.S. Cl.
CPC ............... *E21B 10/00* (2013.01); *E21B 10/02* (2013.01); *E21B 10/08* (2013.01); *E21B 10/26* (2013.01); *E21B 10/42* (2013.01); *E21B 10/43* (2013.01); *E21B 10/62* (2013.01); *B21B 23/00* (2013.01)
USPC ........... 700/245; 700/145; 700/148; 700/219; 700/259; 700/283; 175/57; 175/61; 175/327; 175/331; 175/338; 76/102; 76/108.1; 76/108.2; 76/108.4; 76/115; 29/428

(58) Field of Classification Search
CPC ...................... B23K 31/025; G05B 2219/2616; G05B 2219/39387; G05B 2219/39393; G05B 2219/40032; G05B 2219/45063; Y10S 901/42
USPC ................. 700/114, 145, 148, 219, 259, 283; 901/9, 14, 41, 42; 219/162; 175/40, 57, 175/61, 327, 331, 338; 76/102, 108.1, 76/108.2, 108.4, 115; 29/428
See application file for complete search history.

(56) References Cited

U.S. PATENT DOCUMENTS

| | | |
|---|---|---|
| 4,673,044 A | 6/1987 | Bigelow et al. |
| 4,741,471 A | 5/1988 | Sullivan et al. |
| 4,883,126 A | 11/1989 | Leland |
| 4,887,493 A | 12/1989 | Drake |
| 5,233,150 A | 8/1993 | Schneebeli et al. |
| 5,524,510 A | 6/1996 | Davies et al. |
| 5,752,306 A * | 5/1998 | Clark et al. .................. 29/524.1 |
| 5,900,272 A | 5/1999 | Goodman et al. |
| 5,923,781 A | 7/1999 | Csipkes et al. |
| 5,935,350 A | 8/1999 | Raghu et al. |
| 6,109,371 A | 8/2000 | Kinnan |
| 6,124,564 A | 9/2000 | Sue et al. |
| 6,196,338 B1 | 3/2001 | Slaughter et al. |
| 6,321,862 B1 | 11/2001 | Beuershausen et al. |
| 6,353,771 B1 * | 3/2002 | Southland .................... 700/197 |
| 6,375,895 B1 | 4/2002 | Daemen |
| 6,392,190 B1 | 5/2002 | Sue et al. |
| 6,615,936 B1 | 9/2003 | Mourik et al. |
| 6,665,066 B2 | 12/2003 | Nair et al. |
| 6,675,068 B1 | 1/2004 | Kawasaki |
| 6,861,612 B2 | 3/2005 | Bolton |

| | | | |
|---|---|---|---|
| 6,972,390 B2 | 12/2005 | Hu et al. | |
| 7,032,693 B2 | 4/2006 | Siracki | |
| 7,034,262 B2 | 4/2006 | Fischer et al. | |
| 7,305,115 B2 | 12/2007 | King | |
| 7,361,411 B2 | 4/2008 | Daemen et al. | |
| 7,481,284 B2 | 1/2009 | Wells et al. | |
| 7,703,556 B2 | 4/2010 | Smith et al. | |
| 7,735,582 B2 | 6/2010 | Smith | |
| 7,776,256 B2 | 8/2010 | Smith et al. | |
| 7,836,980 B2 | 11/2010 | Stevens et al. | |
| 7,841,259 B2 | 11/2010 | Smith et al. | |
| 7,954,570 B2 | 6/2011 | McClain et al. | |
| 7,954,571 B2 | 6/2011 | McClain et al. | |
| 7,958,953 B2 | 6/2011 | Chafai | |
| 7,997,359 B2 | 8/2011 | Eason et al. | |
| 8,002,052 B2 | 8/2011 | Stevens et al. | |
| 8,006,785 B2 | 8/2011 | Oldham et al. | |
| 8,007,714 B2 | 8/2011 | Mirchandani et al. | |
| 8,096,372 B2 | 1/2012 | Shen et al. | |
| 8,132,305 B2 * | 3/2012 | Choi et al. | 29/33 P |
| 8,355,815 B2 | 1/2013 | Luce et al. | |
| 2001/0015290 A1 | 8/2001 | Sue et al. | |
| 2002/0035895 A1 | 3/2002 | Davies et al. | |
| 2005/0013465 A1 | 1/2005 | Southall et al. | |
| 2005/0077090 A1 | 4/2005 | Viswanadham et al. | |
| 2006/0177689 A1 | 8/2006 | Muir | |
| 2007/0000698 A1 | 1/2007 | Viswanadham | |
| 2008/0069445 A1 | 3/2008 | Weber | |
| 2008/0223622 A1 * | 9/2008 | Duggan et al. | 175/432 |
| 2008/0319557 A1 | 12/2008 | Summers et al. | |
| 2009/0032310 A1 | 2/2009 | Stevens et al. | |
| 2009/0187373 A1 | 7/2009 | Atwell et al. | |
| 2009/0194329 A1 | 8/2009 | Guimerans et al. | |
| 2010/0204824 A1 * | 8/2010 | Luce et al. | 700/219 |
| 2010/0282026 A1 * | 11/2010 | Luce et al. | 76/108.1 |

FOREIGN PATENT DOCUMENTS

| | | |
|---|---|---|
| EP | 0049899 A1 | 4/1982 |
| EP | 0194050 A1 | 9/1986 |
| EP | 0496181 A1 | 7/1992 |
| EP | 1739277 A1 | 1/2007 |
| GB | 2311085 A | 9/1997 |
| JP | 03196928 A | 8/1991 |
| WO | 9706339 A1 | 2/1997 |

OTHER PUBLICATIONS

Zacny et al., Mars Drill for the Mars Sample Return Mission with a Brushing and Abrading Bit, Regolith and Powder Bit, Core PreView Bit and a Coring Bit, 2012, IEEE, p. 1-8.*

Berge, James M., "Automating the Welding Process, Successful Implementation of Automated Welding Systems," Copyright 1994 by Industrial Press Inc., New York, NY (1994).

Cary, Howard B., "Arc Welding Automation," Copyright 1995 by Marcel Dekker, Inc., New York, NY , Chapters 1-20 and Appendixes (1995). (submitted in six parts).

International Search Report for International Application No. PCT/US2010/023467 mailed Sep. 27, 2010, 3 pages.

International Written Opinion for International Application No. PCT/US2010/023467 mailed Sep. 27, 2010, 3 pages.

International Preliminary Report on Patentability for International Application No. PCT/US2010/023467 dated Aug. 16, 2011, 4 pages.

* cited by examiner

Primary Examiner — McDieunel Marc

(74) Attorney, Agent, or Firm — TraskBritt

(57) ABSTRACT

Methods include one or more of robotically positioning a cutting element on an earth-boring tool, using a power-driven device to move a cutting element on an earth-boring tool, and robotically applying a bonding material for attaching a cutting element to an earth-boring tool. Robotic systems are used to robotically position a cutting element on an earth-boring tool. Systems for orienting a cutting element relative to a tool body include a power-driven device for moving a cutting element on or adjacent the tool body. Systems for positioning and orienting a cutting element on an earth-boring tool include such a power-driven device and a robot for carrying a cutting element. Systems for attaching a cutting element to an earth-boring tool include a robot carrying a torch for heating at least one of a cutting element, a tool body, and a bonding material.

16 Claims, 8 Drawing Sheets

METHODS FOR MANIPULATING CUTTING ELEMENTS FOR EARTH-BORING DRILL BITS AND TOOLS

CROSS-REFERENCE TO RELATED APPLICATION

This application is a divisional of U.S. patent application Ser. No. 12/370,516, filed Feb. 12, 2009, now U.S. Pat. No. 8,355,815, issued Jan. 15, 2013, the disclosure of which is hereby incorporated herein by this reference in its entirety.

TECHNICAL FIELD

The present invention relates to methods, systems, and devices for at least partially automated manipulation of cutting elements with respect to earth-boring rotary drill bits and other earth-boring tools with which such cutting elements may be associated. More particularly, the present invention relates to methods, systems, and devices for at least partially automated positioning of cutting elements on earth-boring tools, bonding of cutting elements to earth-boring tools, and/or removal of cutting elements from earth-boring tools.

BACKGROUND

Earth-boring tools are used to form wellbores in subterranean formations and include, for example, rotary drill bits (e.g., rolling cutter drill bits, fixed-cutter drag bits, bi-center bits, eccentric bits, and coring bits), percussion drill bits, reamers (including underreamers), and mills.

An earth-boring rotary drill bit 100 is shown in FIG. 1 that includes a bit body 102. The bit body 102 may be predominantly comprised of a particle-matrix composite material or a metal alloy such as steel. As shown in FIG. 1, the bit body 102 may be secured to a shank 104 having a threaded connection portion 106 (which may conform to industry standards such as those promulgated by the American Petroleum Institute (API)) for attaching the drill bit 100 to a drill string (not shown). The bit body 102 may be secured to the shank 104 using a blank or an extension 108, which also may be predominantly comprised of a metal alloy such as steel, although the bit body 102 optionally may be secured directly to the shank 104.

The bit body 102 shown in FIG. 1 includes internal fluid passageways (not shown) that extend between a face 103 of the bit body 102 and a longitudinal bore or plenum (not shown), which extends through the shank 104, the extension 108, and partially through the bit body 102. Nozzle inserts 124 are provided at the face 103 of the bit body 102 within the internal fluid passageways. The bit body 102 includes a plurality of blades 116 that are separated by junk slots 118. Gage pads 122 and wear knots 128 are also provided on the bit body 102. A plurality of cutting elements 110 (which may include, for example, PDC cutting elements) are attached to the face of the bit body 102 in cutting element pockets 112 that are located along each of the blades 116. The cutting elements 110 may be generally cylindrical, and may have a front cutting face 114 and a generally cylindrical lateral side surface 115.

When fabricating an earth-boring tool, such as the rotary drill bit 100 shown in FIG. 1, for example, the cutting elements 110 are secured to the body of the earth-boring tool by manually brazing each cutting element 110 into a cutting element pocket 112 previously formed in the body of the earth-boring tool. For example, a cutting element 110 is manually inserted into a cutting element pocket 112, after which a torch (not shown) may be used to heat the cutting element 110 and the body of the tool adjacent the cutting element pocket 112. After heating the cutting element 110 and the body to an elevated temperature (e.g., about 500° C.-700° C.), the torch may be used to manually heat and melt a metal or metal alloy brazing material, and the molten brazing material may be manually applied to the interface between the cutting element 110 and the surfaces of the body defining the cutting element pocket 112 therein. As the molten brazing material is applied to the interface between the cutting element 110 and the surfaces of the body defining the cutting element pocket 112, the cutting element 110 may be rotated or spun within the cutting element pocket 112 in an effort to at least substantially fill the gap or gaps between the cutting element 110 and the surfaces of the body defining the cutting element pocket 112 at the interface therebetween.

Such manual processes are often conducted by two persons, one of which operates the torch and applies the molten brazing material to the interface between the cutting element 110 and the surfaces of the body defining the cutting element pocket 112, and the other of which rotates the cutting element 110 within the cutting element pocket 112 as the molten brazing material is applied to the interface between the cutting element 110 and the surfaces of the body defining the cutting element pocket 112.

BRIEF SUMMARY

In some embodiments, the present invention includes methods of robotically positioning at least one cutting element on an earth-boring tool. The at least one cutting element may be carried by a robot configured to move the at least one cutting element in three-dimensional space. For example, the at least one cutting element may be loaded in a fixture carried by the robot, and computer code may be executed in an electronic control system that at least partially controls the robot. Execution of the computer code may cause the robot to at least substantially automatically position the at least one cutting element on or adjacent an earth-boring tool. For example, the robot may be caused to position the at least one cutting element at least partially within a cutting element pocket defined by at least one surface of a body of an earth-boring tool.

Additional embodiments of the present invention include methods of attaching at least one cutting element to an earth-boring tool in which a cutting element is positioned at least partially within a cutting element pocket defined by at least one surface of a body of an earth-boring tool, a power-driven device is used to move the cutting element within the cutting element pocket, and a bonding material is applied to an interface between the cutting element and the body of the earth-boring tool. For example, a cutting element may be manually or robotically positioned at least partially within a cutting element pocket defined by at least one surface of a body of an earth-boring tool. A movable surface of a power-driven device may be abutted against a surface of the cutting element, and the movable surface of the power-driven device may be moved to cause the cutting element to rotate within the cutting element pocket. Bonding material may be manually or robotically applied to an interface between the cutting element and a surface of the body before rotating the cutting element using the power-driven device, while rotating the cutting element using the power-driven device, and/or after rotating the cutting element using the power-driven device.

Additional embodiments of the present invention include methods of robotically positioning at least one cutting element on an earth-boring tool in which a cutting element is robotically positioned in a pocket defined by at least one surface of a body of an earth-boring tool, and a power-driven device is used to rotate the cutting element within the cutting element pocket.

Additional embodiments of the present invention include methods of attaching at least one cutting element to an earth-boring tool in which a cutting element is manually or robotically positioned in a pocket defined by at least one surface of a body of an earth-boring tool, and a bonding material is robotically applied to an interface between the cutting element and the at least one surface of the body of the earth-boring tool defining the cutting element pocket.

In yet further embodiments, the present invention includes systems for orienting a cutting element relative to an earth-boring tool. The systems include a device configured to hold a body of an earth-boring tool and a power-driven device configured to rotate a cutting element positioned within a cutting element pocket defined by at least one surface of the body of the earth-boring tool when a movable surface of the power-driven device is abutted against the cutting element and the power-driven device is used to move the movable surface relative to the cutting element.

Additional embodiments of the present invention include systems for positioning and orienting at least one cutting element on a body of an earth-boring tool. The systems include a device configured to hold a body of an earth-boring tool, a robot carrying a fixture configured to hold at least one cutting element to be attached to a body of an earth-boring tool, and a power driven device configured to rotate a cutting element positioned within a cutting element pocket defined by at least one surface of a body of an earth-boring tool when a movable surface of the power-driven device is abutted against the cutting element and the power-driven device is used to move the movable surface relative to the cutting element.

Yet further embodiments of the present invention include systems for attaching at least one cutting element to an earth-boring tool that include a device configured to hold a body of an earth-boring tool, a robot carrying a fixture configured to hold at least one cutting element to be attached to a body of an earth-boring tool, and an additional robot carrying a torch for heating at least one of a cutting element, a body of an earth-boring tool, and a bonding material for bonding a cutting element to a body of an earth-boring tool.

BRIEF DESCRIPTION OF THE SEVERAL VIEWS OF THE DRAWINGS

While the specification concludes with claims particularly pointing out and distinctly claiming that which is regarded as the present invention, the advantages of this invention may be more readily ascertained from the description of embodiments of the invention when read in conjunction with the accompanying drawings, in which:

DETAILED DESCRIPTION

Illustrations presented herein are not meant to be actual views of any particular device or system, but are merely idealized representations that are employed to describe the present invention. Additionally, elements common between figures may retain the same numerical designation.

Figure 2:
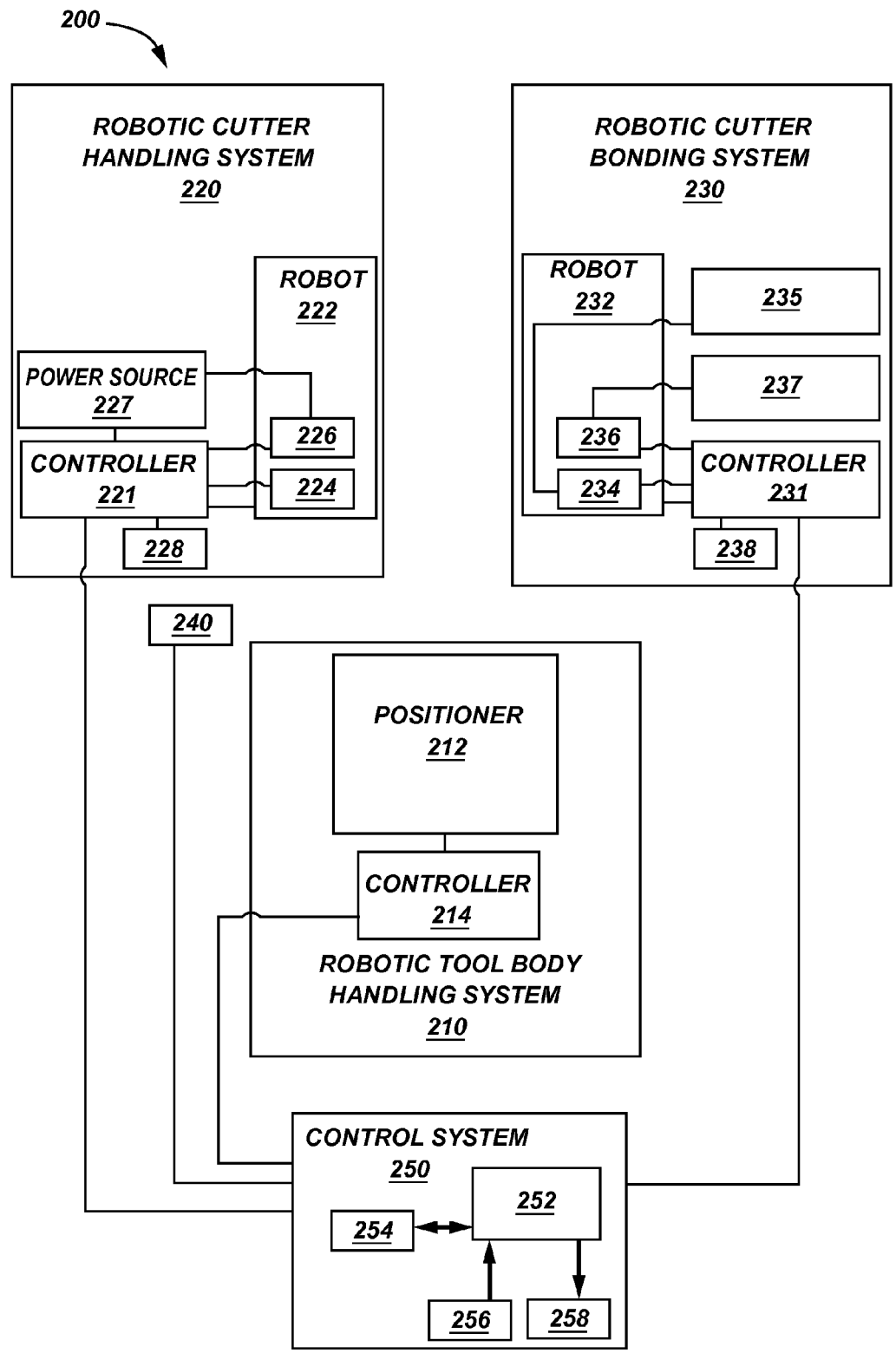
FIG. 2 is a schematic representation of an embodiment of a system of the present invention that may be used to manipulate cutting elements for earth-boring tools.

An embodiment of a cutting element attachment system 200 of the present invention is represented schematically in FIG. 2. The cutting element attachment system 200 shown in FIG. 2 includes a robotic tool body handling system 210, a robotic cutter handling system 220, and a robotic cutter bonding system 230. The cutting element attachment system 200 also includes a main control system 250, which may be used to control and/or electrically communicate with one or more of the controllable subsystems and devices of the cutting element attachment system 200. Each of these systems and devices is described in further detail below.

Figure 1:
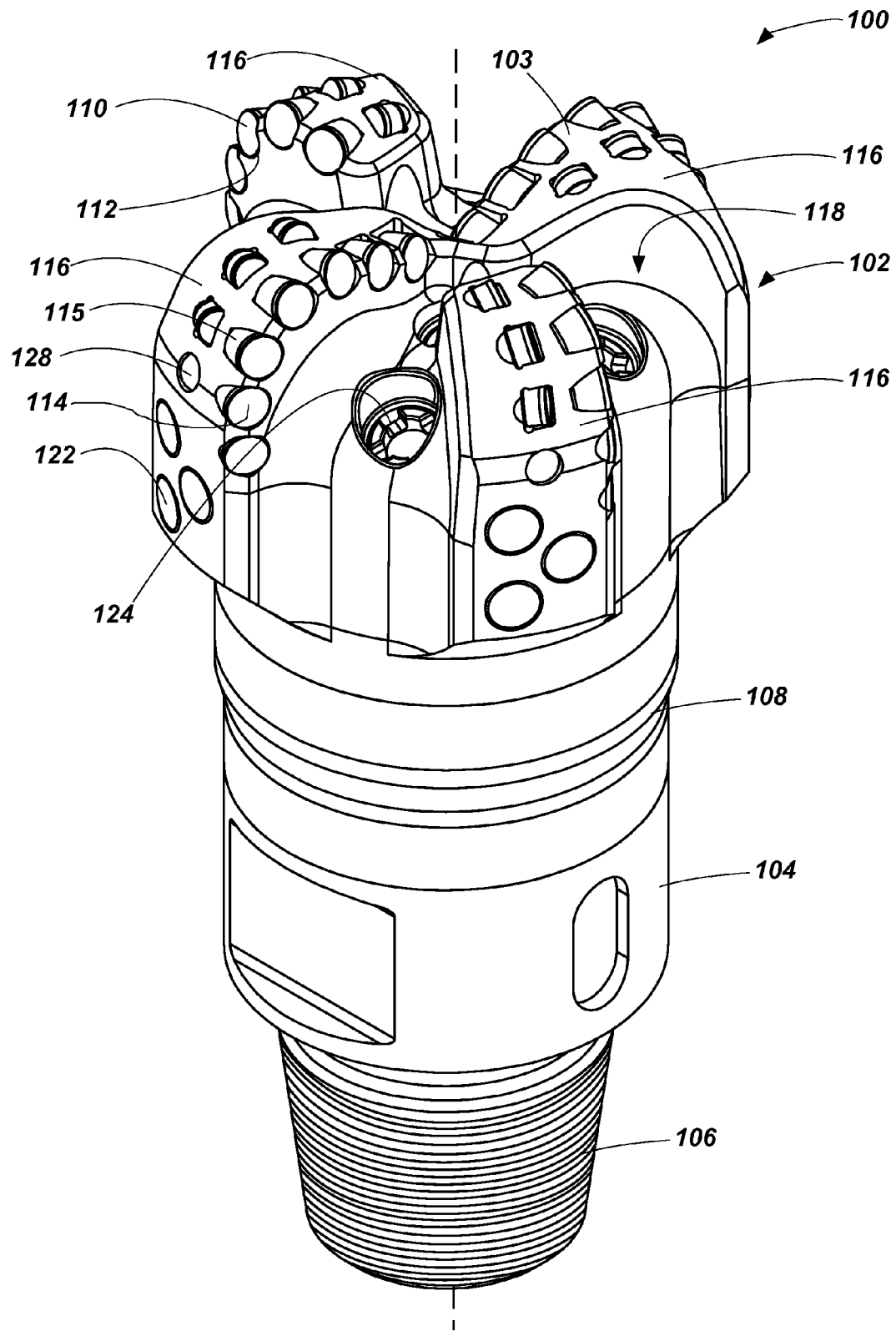
FIG. 1 is a perspective view of an earth-boring tool having a body and cutting elements that may be manipulated using embodiments of methods, systems, and devices of the present invention.

The robotic tool body handling system 210 is a system for holding and manipulating a body 102 of an earth-boring tool such as, for example, the bit body 102 of the drill bit 100 shown in FIG. 1, as cutting elements 110 are attached thereto. The tool body handling system 210 may comprise a workpiece positioner 212 comprising a robotic device having a chuck or other device that may be used to secure the body 102 of an earth-boring tool to the robotic device. The positioner 212 may be configured to move the body 102 of an earth-boring tool in three-dimensional space about two (2) or more axes of movement. In other words, the positioner 212 may have at least two degrees of freedom in movement. By way of example and not limitation, the positioner 212 may comprise a so-called "tilt/rotate" positioner, or the positioner 212 may comprise a "dual-axis orbital" (also referred to as a "sky-hook") positioner. Such workpiece positioners are commercially available from, for example, ABB Ltd. of Zurich Switzerland, which has corporate headquarters for North America in Norwalk, Conn.

The robotic tool body handling system 210 also may comprise a controller 214 for controlling the active elements of the robotic device of the positioner 212 and for electrically communicating with (e.g., receiving electronic signals from and/or sending electronic signals to) the main control system 250 of the cutting element attachment system 200.

With continued reference to FIG. 2, the robotic cutter handling system 220 includes a robot 222 for positioning a cutting element 110 on or adjacent a surface of a body 102 of an earth-boring tool held by the positioner 212, as well as a controller 221 for controlling the robot 222 and electrically communicating with the main control system 250 of the cutting element attachment system 200. The robot 222 may comprise, for example, an articulated robotic arm capable of moving a cutting element 110 in three-dimensional space about three (3) or more axes. In other words, the robot 222 may have three or more (e.g., three, four, five, six, etc.) degrees of freedom in movement of a cutting element 110 carried by the robot 222. Articulated robotic arms that may be used as a robot 222 of the present invention are also commercially available from, for example, ABB Ltd. of Zurich Switzerland, which has corporate headquarters for North America in Norwalk, Conn.

The robotic cutter handling system 220 further includes a cutter holding device 224 for holding a cutting element 110 as the cutting element 110 is positioned on or adjacent a surface of a body 102 of an earth-boring tool using the robot 222. In some embodiments, the cutter holding device 224 may comprise, for example, a three point chuck. In other embodiments, the cutter holding device 224 may comprise a two point pinching device, a magnetic gripper, a vacuum gripper (a vacuum chuck), a concentric sleeve, an adhesive member (e.g., dual sided tape) or any other device that is capable of selectively gripping and releasing cutting elements 110 to be positioned on or adjacent the body 102 of an earth-boring tool held by the positioner 212. Furthermore, in some embodiments, the cutter holding device 224 may be configured to grip a cutting element 110 by a lateral side surface 115 of the cutting element 110. In other embodiments, the cutter holding device 224 may be configured to hold a cutting element 110 by a front cutting face 114 of a cutting element 110. The cutter holding device 224 may be in electrical communication with the controller 221 and/or the main control system 250, and the controller 221 and/or the main control system 250 may be used to cause the cutter holding device 224 to selectively hold and release a cutting element 110 as the cutting element 110 is manipulated using the cutting element attachment system 200. In yet further embodiments, a graspable feature may be provided on a cutting element 110 such as, for example, a recess (e.g., a hole or a slot) in a surface of the cutting element 110 or a protrusion (e.g., a post) that protrudes outwardly from a surface of the cutting element 110, and the cutter holding device 224 may include a device configured to grasp the graspable feature provided on the cutting element 110.

Cutting elements 110 to be attached to a body 102 of an earth-boring tool may be pre-loaded into a tray that is positioned at a known, fixed location relative to the robot 222, and the robot 222 and cutter holding device 224 may be used to sequentially pick cutting elements 110 from the tray and to place them into position on the body 102 of the earth-boring tool. In other embodiments, the cutter holding device 224 may include a cartridge that is preloaded with a plurality of cutting elements 110 to be attached to the body 102 of the earth-boring tool.

The robotic cutter handling system 220 may also comprise a power-driven device 226 for rotating or otherwise manipulating a cutting element 110 after the cutting element 110 has been positioned within a cutting element pocket 112 of a body 102 of an earth-boring tool using the robot 222 and the cutter holding device 224. As used herein, the term "power-driven device" means and includes any device having a movable component or portion, movement of which is driven by power supplied from a non-human power source (e.g., an electrical power source, a hydraulic power source, a pneumatic power source, etc.). As discussed in further detail below, it may be necessary or desirable to rotate or otherwise manipulate a cutting element 110 within a cutting element pocket 112 as bonding material is applied to an interface between the cutting element 110 and a surface of the body 102 defining the cutting element pocket 112. Furthermore, it may be necessary or desirable to rotate or otherwise manipulate a cutting element 110 within a cutting element pocket 112 into a selected, predetermined orientation relative to the body 102 as the cutting element 110 is attached to the body 102.

The power-driven device 226 may be carried by the robot 222 in a manner similar to that of the cutter holding device 224, thus allowing the robot 222 to move the power-driven device 226 in three-dimensional space about three (3) or more axes of movement. Thus, after the robot 222 positions a cutting element 110 held by the cutter holding device 224 into a cutting element pocket 112, the cutter holding device 224 may be caused to release the cutting element 110, and the robot 222 may be used to move the power-driven device 226 into position relative to the cutting element 110 to allow the power-driven device 226 to rotate or otherwise manipulate the cutting element 110 within the cutting element pocket 112.

The power-driven device 226 may include, for example, a belt or wheel having a surface that, when abutted against a generally cylindrical lateral side surface 115 of a cutting element 110 and caused to move in relation thereto, causes the cutting element 110 to rotate through an arc of greater than 360° about a longitudinal axis of the cutting element 110 within the cutting element pocket 112. Thus, the power-driven device 226 may be said to be configured to "spin" a cutting element 110 within a cutter element pocket 112. As used herein the term "rotate" includes and encompasses spinning.

The cutter holding device 224 and the power-driven device 226 are represented in FIG. 2 as being two physically separate devices that are each carried by the robot 222. In additional embodiments, the cutter holding device 224 and the power-driven device 226 may be part of a single device. For example, a magnetic or vacuum chuck that is capable of holding a cutting element 110 by a front cutting face 114 of the cutting element 110 may be configured to be rotatable along a rotational axis that is at least substantially aligned with a central longitudinal axis of a cutting element 110 when the cutting element 110 is held by the magnetic or vacuum chuck. In such embodiments, the magnetic or vacuum chuck may be used to hold a cutting element 110 as the robot 222 positions the cutting element 110 into cutting element pocket 112. After positioning the cutting element 110 at least partially within the cutting element pocket 112, and prior to releasing the cutting element 110 from the magnetic or vacuum chuck, the magnetic or vacuum chuck may be caused to rotate about its axis of rotation, thereby causing the cutting element 110 held by the magnetic or vacuum chuck to rotate about the central longitudinal axis of a cutting element 110 within the cutting element pocket 112.

The robotic cutter handling system 220 may comprise a power source 227 for supplying power to the power-driven device 226. The power source 227 may comprise, for example, an electrical motor, a pneumatic motor, or a hydraulic motor.

The robotic cutter handling system 220 may further comprise one or more sensors 228. The one or more sensors 228 may be used to determine, for example, a position of a cutting element 110 in three-dimensional space, a position of a surface of a body 102 of an earth-boring tool in three-dimensional space, and/or a rotational orientation of a cutting element 110 within a cutting element pocket 112. For example, in some applications, it may be necessary or desirable to provide a particular rotational orientation of a cutting element 110 within a cutting element pocket 112. A mark or feature may be provided on an exterior surface of the cutting element 110, and the sensor 228 may be used to sense a position of the mark or feature on the cutting element 110. In such embodiments, the power-driven device 226 may be used to rotate a cutting element 110 within a cutting element pocket 112 until the sensor 228 senses that the mark or feature on the cutting element 110 is in a desirable position, at which time the controller 221 may be used to control the power-driven device 226 to cease rotation of the cutting element 110 such that the cutting element 110 is provided in the desirable rotational orientation with the cutting element pocket 112. By way of example and not limitation, the sensor 228 may comprise a camera, a laser distance finder, a proximity sensor, or a point contact sensor.

In the configuration described above, five (5) or more degrees of freedom in movement may be provided between the body 102 of an earth-boring tool held by the positioner 212 and a cutting element 110 carried by the cutter holding device 224 and the robot 222.

With continued reference to FIG. 2, the robotic cutter bonding system 230 includes a robot 232 carrying one or more devices that may be used to bond a cutting element 110 to a body 102 of an earth-boring tool after the robotic cutter handling system 220 has been used to position the cutting element 110 adjacent the body 102. The robotic cutter bonding system 230 also includes a controller 231 for controlling the robot 232 and communicating electrically with the main control system 250 of the cutting element attachment system 200. The robot 232 also may comprise, for example, an articulated robotic aim capable of moving one or more devices carried thereby in three-dimensional space about three (3) or more axes. In other words, the robot 232 may have three or more (e.g., three, four, five, six, etc.) degrees of freedom in movement of the one or more devices carried by the robot 232. Articulated robotic arms that may be used as a robot 232 of the present invention are commercially available from, for example, ABB Ltd. of Zurich Switzerland, which has corporate headquarters for North America in Norwalk, Conn. In some embodiments, the robot 232 of the robotic cutter bonding system 230 may be substantially similar to the robot 222 of the robotic cutter handling system 220.

The robotic cutter bonding system 230 may comprise a dispensing device 234 carried by the robot 232. The dispensing device 234 may be configured for dispensing bonding material for use in bonding a cutting element 110 to a body 102 of an earth-boring tool. For example, a metal alloy bonding material (e.g., a brazing material) may be used to bond a cutting element 110 to a body 102. Such a metal alloy bonding material may be supplied in wire form, and the dispensing device 234 may comprise a wire feeder device. Such wire feeder devices are known in the art and commercially available from, for example, Miller Electric Mfg. Co. of Appleton, Wis. In additional embodiments, a metal alloy bonding material (e.g., a brazing material) may be supplied in a paste form, and the dispensing device 234 may comprise a nozzle or aperture for dispensing paste therefrom.

Bonding material may be supplied to the dispensing device 234 from a source 235 of bonding material. The source 235 of bonding material may comprise, for example, a spool of a wire of bonding material. In additional embodiments, other bonding materials may be used. For example, an epoxy-based material may be used to bond a cutting element 110 to a body 102 of an earth-boring tool. In such embodiments, the dispensing device 234 may comprise a nozzle configured to direct liquid epoxy-based material therefrom, the source 235 of bonding material may comprise a container of liquid epoxy-based material, and a conduit (e.g., a hose or tube) may be used to supply liquid epoxy-based material from the container to the nozzle. Furthermore, the bonding material may comprise a brazing material in paste form.

In yet further embodiments, a bonding material may be pre-applied to surfaces of one or both of a cutting element 110 and the body 102 of an earth-boring tool such that the robotic cutter bonding system 230 need not include a dispensing device 234 for dispensing the bonding material. In yet further embodiments, a foil comprising a metal brazing alloy may be provided between a cutting element 110 and the body 102 of an earth-boring tool, and the foil may be heated to melt the foil and braze the cutting element 110 to the body 102.

The robotic cutter bonding system 230 may further comprise a torch 236 or other heat source for heating at least one of a cutting element 110, a body 102 of an earth-boring tool, and a bonding material dispensed by the dispensing device 234. For example, in embodiments in which a metal alloy bonding material is used, the torch 236 may comprise, for example, an acetylene torch, an oxy-acetylene torch, or an arc-welding torch (a tungsten-inert gas (TIG) arc welding torch or a plasma transferred arc (PTA) welding torch), which may be used to melt the metal alloy bonding material to facilitate application of molten metal alloy bonding material to an interface between a surface of a cutting element 110 and an adjacent surface of a body 102 of an earth-boring tool. If the torch 236 employs combustion of a fuel, the robotic cutter bonding system 230 may comprise a source 237 of fuel (e.g., acetylene, a mixture of oxygen and acetylene, or another combustible fuel gas mixture) for supplying fuel to the torch 236.

In additional embodiments, the robotic cutter bonding system 230 may comprise an induction heater or one or more lasers in place of, or in addition to, the torch 236 for heating at least one of a cutting element 110, a body 102 of an earth-boring tool, and a bonding material dispensed by the dispensing device 234.

The dispensing device 234 for dispensing bonding material and the torch 236 each may be in electrical communication with, and selectively controllable by, the controller 231. Furthermore, the controller 231 may be in electrical communication with the main control system 250, as are the controller 214 of the tool body handling system 210 and the controller 221 of the cutter handling system 220, to allow the main control system 250 to coordinate and control the movement of the various systems and devices of the cutting element attachment system 200.

In yet further embodiments, the robotic cutter bonding system 230 may comprise a device for friction welding a cutting element 110 to a body 102. For example, at least a portion of an outer surface of a cutting element 110 may be coated with a metal alloy (or at least a portion of the body 102 within a cutting element pocket 112, or both, may be coated with the metal alloy), and the robotic cutter bonding system 230 may be configured to rotate the cutting element 110 within the cutting element pocket 112 in such a matter as to generate friction between the body 102 and the metal alloy coating on the cutting element 110 to result in a friction weld between the body 102 and the cutting element 110.

The robotic cutter bonding system 230 may further comprise one or more sensors 238. The one or more sensors 238 may be used to determine, for example, a position of at least one of the device for dispensing bonding material 234, the torch 236, a surface of a body 102 of an earth-boring tool, and a surface of a cutting element 110 in three-dimensional space. By way of example and not limitation, the one or more sensors 238 may comprise a camera, a laser distance finder, a proximity sensor, or a point contact sensor.

In additional embodiments, the device for dispensing bonding material 234 and the torch 236 may be carried by separate, but similar, articulated robotic arms, which may improve the ability of the components of the robotic cutter bonding system 230 to access all required locations on the complex geometry of a body 102 of an earth-boring tool.

As shown in FIG. 2, the cutting element attachment system 200 may include one or more additional sensors 240, which may be in direct or indirect electrical communication with the main system controller 250. By way of example and not limitation, the sensor or sensors 240 may comprise a vision system configured to acquire one or more images of a body 102 of an earth-boring tool, and to electrically and at least substantially automatically analyze such images using one or more algorithms. For example, the images acquired by such a vision system may be used to identify a position and/or orientation of the body 102 in three-dimensional space, or to identify a shape and/or size of a cutting element pocket 112 in which a cutting element 110 is to be attached using the cutting element attachment system 200. Such vision systems and software that may be used to electrically and at least substantially automatically analyze images acquired thereby are commercially available from, for example, Cognex Corporation of Natick, Mass.

Techniques for analyzing images acquired by vision systems to determine shape, position, and/or orientation of objects represented in such images are known in the art and disclosed in, for example, U.S. Pat. No. 5,923,781 to Csipkes et al., which is entitled "Segment Detection System and Method," U.S. Pat. No. 6,665,066 to Nair et al., which is entitled "Machine Vision System and Method for Analyzing Illumination Lines in an Image to Determine Characteristics of an Object Being Inspected," and U.S. Pat. No. 7,305,115 to King, which is entitled "Method and System for Improving Ability of a Machine Vision System to Discriminate Features of a Target," U.S. Patent Application Publication No. 2005/0013465 A1 to Southall et al., which is entitled "Method and Apparatus for Refining Target Position and Size Estimates Using Image and Depth Data," and U.S. Patent Application Publication No. 2008/0069445 A1 to Weber, which is entitled "Image Processing Apparatus and Methods," the disclosures of which are incorporated herein in their entirety by this reference. Such methods, or methods substantially similar to such methods, may be used to identify an actual position and/or orientation of the body 102 in three-dimensional space, or to identify an actual size, position, and/or orientation of a cutting element pocket 112 in which a cutting element 110 is to be attached.

By way of example and not limitation, a camera of a vision system may be placed in front of a cutting element pocket 112 and aligned with a longitudinal axis of the cutting element pocket 112 to acquire an image of the generally circular surface of the body 102 at the back of the cutting element pocket 112. If axial alignment of the camera with the longitudinal axis of the cutting element pocket 112 is not achieved to within approximately one-eighth of an inch, a portion of the surface of the body 102 at the back of the cutting element pocket 112 may be occluded in the acquired image. After aligning the camera of the vision system with the longitudinal axis of the cutting element pocket 112, an image of the surface of the body 102 at the back of the cutting element pocket 112 may be acquired using the camera of the vision system. After acquiring the image, the image may be analyzed to identify the location of at least a portion of the circumferential boundary of the circular surface of the body 102 at the back of the cutting element pocket 112. The center of the cutting element pocket 112 then may be determined from the location and radius of the portion of the circumferential boundary of the circular surface of the body 102 at the back of the cutting element pocket 112. In some situations, other portions of the body 102 of the earth-boring tool may physically obstruct the field of view of the camera such that the camera cannot acquire a full image of the entire circular surface of the body 102 at the back of the cutting element pocket 112. In such situations, the region of interest in the acquired image may be selected to include only a visible portion of the circumferential boundary of the circular surface of the body 102 at the back of the cutting element pocket 112, and only the visible portion of the circumferential boundary of the circular surface of the body 102 may be used to determine the center of the cutting element pocket 112. Lights may be used to enhance the contrast in the images acquired by the camera of the vision system and improve the accuracy with which the location of the cutting element pocket 112 is determined.

In additional embodiments, the one or more sensors 240 may include one or more of a temperature sensor for determining a temperature of at least a portion of a body 102 of an earth-boring tool or a cutting element 110, a tactile sensor for determining a location of a surface of a body 102 or a cutting element 110 in three-dimensional space, and a laser sensor for determining a location of a surface of a body 102 or a cutting element 110 in three-dimensional space. X-ray sensors and/or ultrasonic sensors also may be used to identify locations and orientations of one or more features of a body 102 of an earth-boring tool.

The main control system 250 of the cutting element attachment system 200 may include an electronic signal processor 252, as well as memory 254 for storing data in electrical communication with the electronic signal processor 252. The main control system 250 may further include at least one input device 256 such as, for example, a keyboard or a mouse, for inputting data or information into the main control system 250, and at least one output device 258 such as, for example, a printer, a monitor, or a screen, for outputting data or information from the main control system 250.

In the configurations described hereinabove, the cutting element attachment system 200 may be used to at least substantially automatically (e.g., robotically) attach one or more cutting elements 110 to a body 102 of an earth-boring tool. The positioner 212 may be used to manipulate a body 102 of an earth-boring tool, and the robot 222 may be used to manipulate a cutting element 110 carried by the cutter holding device 224 so as to at least substantially automatically position the cutting element 110 within a cutting element pocket 112 of the body 102. After positioning the cutting element 110 within a cutting element pocket 112 of the body 102, the power-driven device 226 may be used to rotate the cutting element 110, and the robot 232 may be used to manipulate a dispensing device 234 (and, optionally, a torch 236) carried by the robot 232 so as to at least substantially automatically dispense bonding material onto an interface between surfaces of the rotating cutting element 110 and adjacent surfaces of the body 102 that define the cutting element pocket 112.

It is understood that embodiments of systems of the present invention may not include each of a robotic tool body handling system 210, a robotic cutter handling system 220, and a robotic cutter bonding system 230, as does the cutting element attachment system 200 shown in FIG. 2. For example, additional embodiments of systems of the present invention may include only a robotic tool body handling system 210 and a robotic cutter handling system 220, and bonding of the cutting elements 110 to a body 102 of an earth-boring tool may be conducted manually. Further embodiments of systems of the present invention may include only a robotic tool body handling system 210 and a robotic cutter bonding system 230, and cutting elements 110 may be placed within cutting element pockets 112 manually prior to bonding the cutting elements 110 to a body 102 of an earth-boring tool using the robotic cutter bonding system 230. Yet further embodiments of systems of the present invention may include only a robotic cutter handling system 220 and a robotic cutter bonding system 230, without employing a robotic tool body handling system 210 to manipulate a body 102 of an earth-boring tool as cutting elements 110 are positioned thereon using the robotic cutter handling system 220 and bonded to the body 102 using the robotic cutter bonding system 230. In yet further embodiments of systems of the present invention, a robotic tool body handling system 210 may be used to manipulate a body 102 of an earth-boring tool relative to one or more cutting element fixtures located in a fixed position in three-dimensional space to position one or more cutting elements held therein into cutting element pockets of the body 102.

Figure 3A:
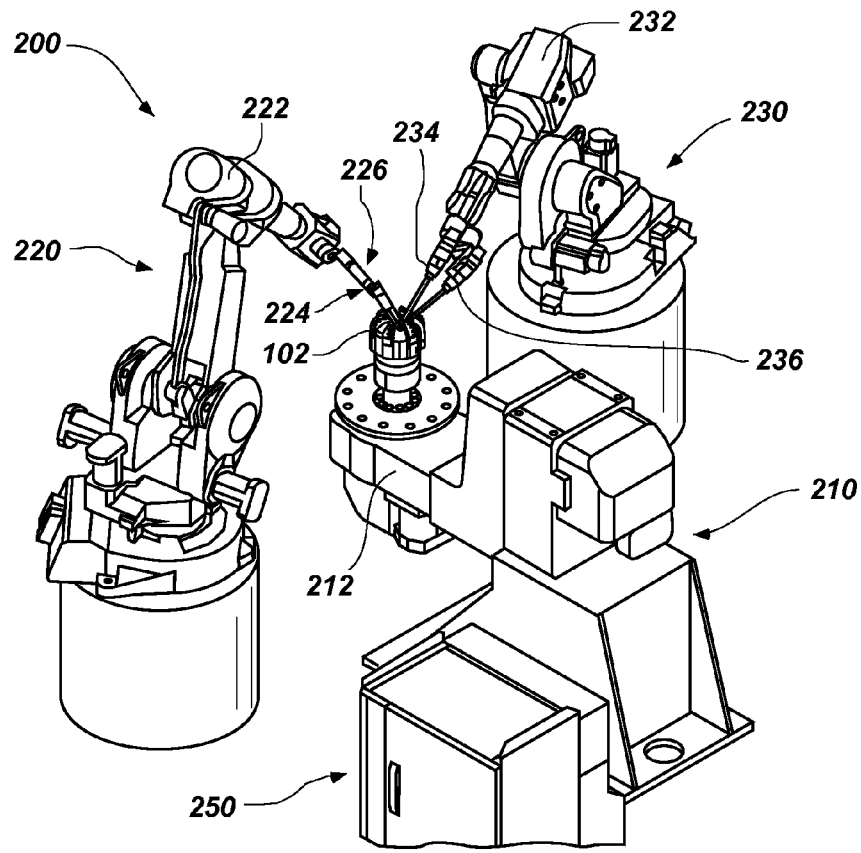
FIG. 3A is a perspective view of an embodiment of a system of the present invention that may be used to manipulate cutting elements and bodies of earth-boring tools.
Figure 3B:
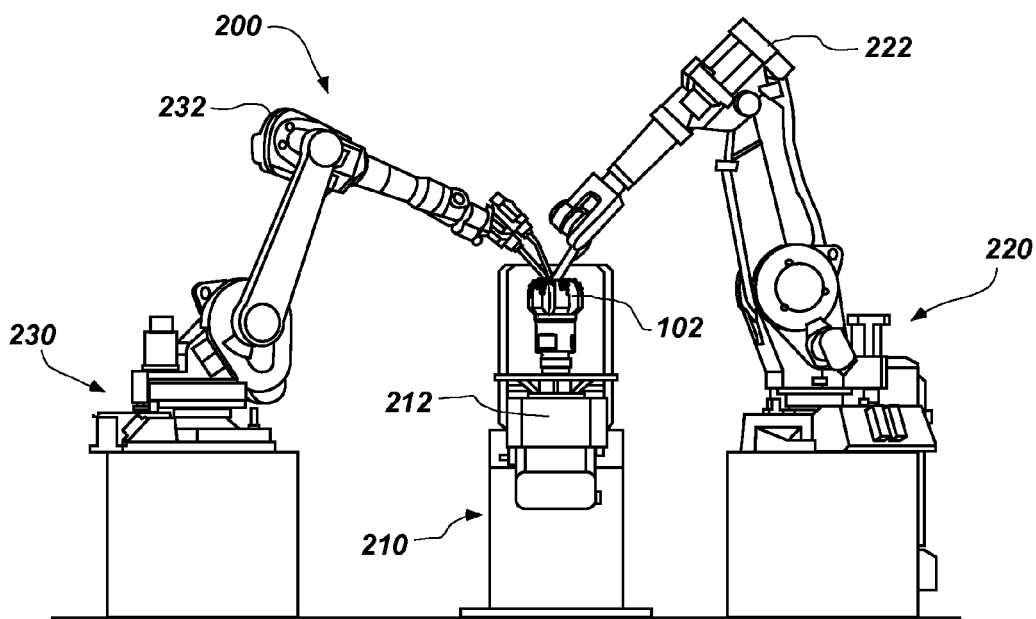
FIG. 3B is a side view of the system shown in FIG. 3A.

FIG. 3A is a perspective view of one particular embodiment of a cutting element attachment system 200 of the present invention that may be used to manipulate cutting elements and bodies of earth-boring tools, and FIG. 3B is a side view of the system shown in FIG. 3A. The cutting element attachment system 200 shown in FIGS. 3A and 3B includes a robotic tool body handling system 210, a robotic cutter handling system 220, a robotic cutter bonding system 230, and a main control system 250 (FIG. 3A), which may be used to control and/or electrically communicate with one or more of the controllable subsystems and devices of the cutting element attachment system 200. The robotic tool body handling system 210 includes a workpiece positioner 212 for holding a body 102 of an earth-boring tool. The robot 232 of the robotic cutter bonding system 230 and the robot 222 of the robotic cutter handling system 220 each comprise a six-axis articulated robotic arm. In additional embodiments, the workpiece positioner 212 also may comprise a multi-axis robotic manipulator, such as a six-axis articulated robotic arm.

Figure 4A:
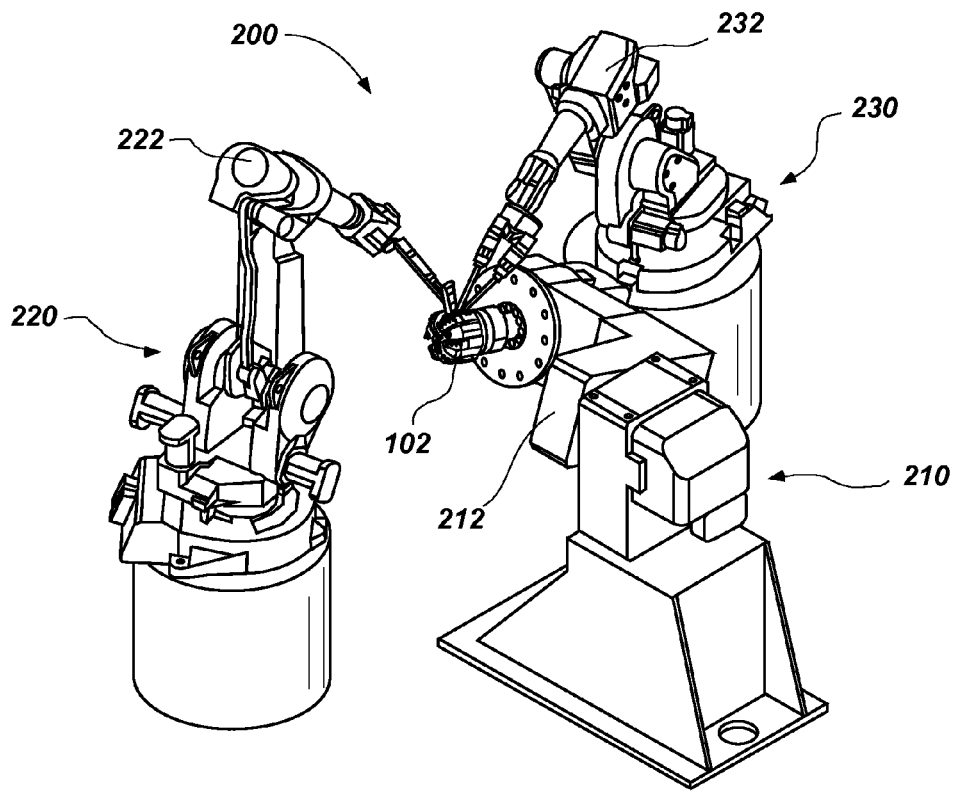
FIG. 4A is a perspective view like that of FIG. 3A illustrating components of the system shown in FIG. 3A in different positions.
Figure 4B:
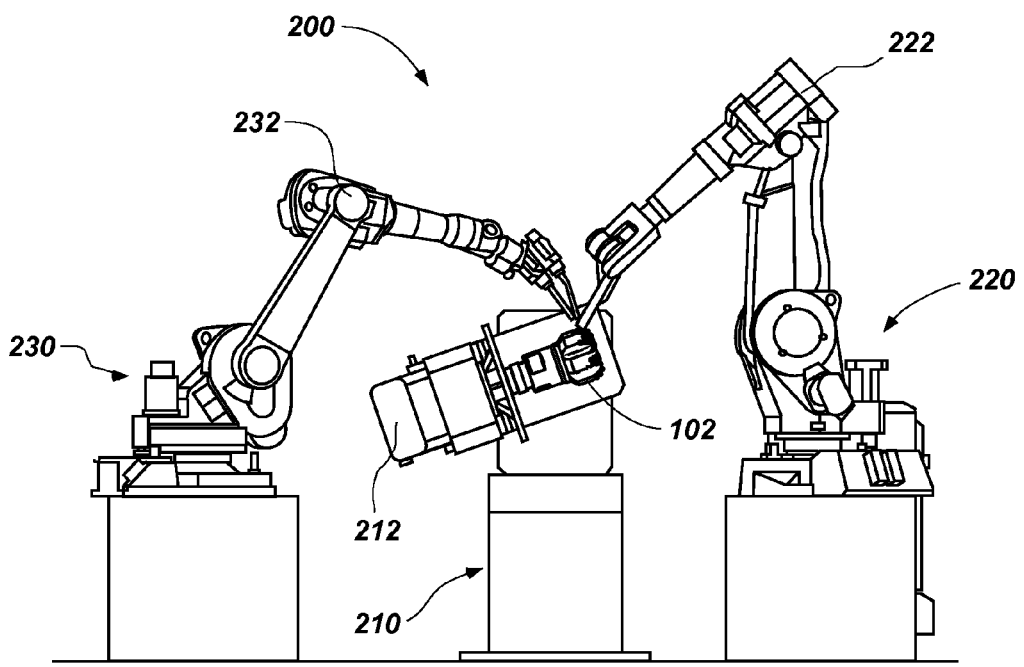
FIG. 4B is a side view of the system shown in FIG. 4A.

FIGS. 3A and 3B illustrate the positioner 212 holding the body 102 in a particular position and orientation in three-dimensional space while the robot 222, the cutter holding device 224, and the power-driven 226 of the robotic cutter handling system 220 are used to position a cutting element 110 in a cutting element pocket 112 located on a radially inward cone region on a face 103 (FIG. 1) of body 102, and the robot 232, the device for dispensing bonding material 234, and the torch 236 of the robotic cutter bonding system 230 are used to bond the cutting element 110 to the body 102. The positioner 221 may be used to manipulate the body 102 into desirable positions and orientations as a cutting element 110 is positioned within each of a plurality of cutting element pockets 112 and the cutting elements 110 are attached to the body 102. FIGS. 4A and 4B are substantially similar to FIGS. 3A and 3B, respectively, but illustrate the positioner 212 holding the body 102 in a different position and orientation in three-dimensional space while the robotic cutter handling system 220 is used to position a cutting element 110 in a cutting element pocket 112 located on a radially outward shoulder region on a face 103 (FIG. 1) of the body 102, and the robotic cutter bonding system 230 is used to bond the cutting element 110 to the body 102. It may be desirable to orient each cutting element 110 and the body 102 such that the longitudinal axis of each respective cutting element 110 is disposed transverse (at least generally perpendicular) to the gravitational field as that cutting element 110 is bonded to the body 102, as discussed in further detail below.

Figure 5:
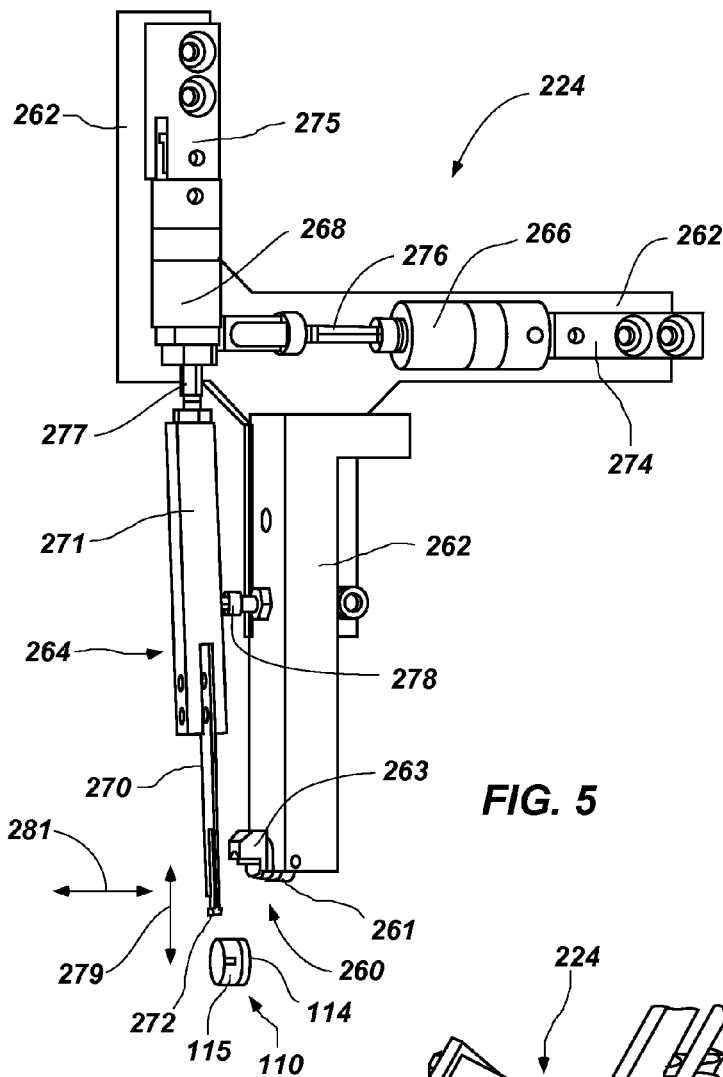
FIG. 5 is a perspective view of an embodiment of a cutter holding device of the present invention that may be used in conjunction with embodiments of systems of the present invention, such as those represented in FIGS. 2, 3A, 3B, 4A, and 4B.

FIG. 5 illustrates an embodiment of a cutter holding device 224 of the present invention that may be used in the cutting element attachment system 200 (FIGS. 3A, 3B, 4A and 4B). The cutter holding device 224 shown in FIG. 5 includes a magnetic device 260 disposed at an end of a body 262 of the cutter holding device 224. The magnetic device 260 may comprise at least one physical magnet 261 that provides a magnetic field for holding a cutting element 110 comprising a magnetic material adjacent the magnetic device 260 when the cutting element 110 is brought in proximity to the physical magnet 261. The magnetic device 260 may be shaped to provide a groove, recess, or pocket therein, in which a cutting element 110 may be contained as the cutting element 110 is being held adjacent the magnetic device 260 by the magnetic field of the physical magnet 261. For example, the magnetic device 260 may include a container device 263 (as shown in FIG. 5) that is configured to contain a cutting element 110 at least partially therein when a cutting element 110 is being held by the magnet 261 of the magnetic device 260.

In additional embodiments, the magnetic device 260 may comprise one or more electrical magnetic devices configured to generate a magnetic field in place of, or in addition to, the at least one physical magnet 261 to provide a magnetic field for holding a cutting element 110 in position against the magnetic device 260. In additional embodiments, mechanical tweezers or pinchers may be used in place of, or in addition to, the magnetic device 260 for holding and carrying a cutting element 110.

The cutter holding device 224 shown in FIG. 5 also includes a movable manipulator arm 264. The manipulator arm 264 may be used to assist in holding a cutting element 110 in place adjacent the magnetic device 260 and/or to facilitate the removal of a cutting element 110 from the magnetic device 260 after the cutter holding device 224 has been used (in conjunction with the robot 222 (FIGS. 3A, 3B, 4A and 4B)) to place the cutting element 110 into position on or adjacent a body 102 of an earth-boring tool. As shown in FIG. 5, the manipulator arm 264 may comprise an elongated rod member 270 extending from an arm body 271. One end of the rod member 270 is attached to the arm body 271, and an opposite, free end 272 of the rod member 270 is positioned proximate the magnetic device 260.

The manipulator arm 264 may be movable relative to the magnetic device 260. For example, the cutter holding device 224 may include a first air cylinder 266 for selectively moving the free end 272 of the elongated rod 270 back and forth in a sideways motion (from the perspective of FIG. 5) toward and away from the magnetic device 260 in the general direction indicated by arrows 281 in FIG. 5. The cutter holding device 224 may include a second air cylinder 268 for selectively moving the free end 272 of the elongated rod member 270 up and down in a vertical motion (from the perspective of FIG. 5) relative to the magnetic device 260 in the general direction indicated by arrows 279 in FIG. 5. In additional embodiments, hydraulic cylinders, solenoids, or servo motors may be used in place of the first and second air cylinders 266, 268 for selectively moving the manipulator arm 264 relative to the body 262 of the cutter holding device 224.

A cylinder body of the first air cylinder 266 may be pivotally attached to a mounting bracket 274 that is fixedly attached to the body 262 of the cutter holding device 224. A plunger 276 of the first air cylinder 266 may be pivotally attached to a cylinder body of the second air cylinder 268. The cylinder body of the second air cylinder 268 also may be pivotally attached to a mounting bracket 275, which is fixedly attached to the body 262 of the cutter holding device 224. A plunger 277 of the second air cylinder 268 is attached to the arm body 271 of the manipulator arm 264. The arm body 271 of the manipulator aim 264 also may be movably attached to the body 262 of the cutter holding device 224 using, for example, a support arm 278 to provide additional support and stability to the manipulator arm 264 while allowing the manipulator arm 264 to move relative to the body 262 in response to actuation of the first and second air cylinders 266, 268.

As the plunger 276 is caused to move out from the cylinder body of the first air cylinder 266, the movement of the plunger 276 will cause the second air cylinder 268 and the manipulator arm 264 attached thereto to move in the leftward direction (from the perspective of FIG. 5), thereby causing the free end 272 of the rod member 270 to move away from the magnetic device 260. Conversely, as the plunger 276 is caused to move into the cylinder body of the first air cylinder 266, the movement of the plunger 276 will cause the second air cylinder 268 and the manipulator arm 264 attached thereto to move in the rightward direction (from the perspective of FIG. 5), thereby causing the free end 272 of the rod member 270 to move toward the magnetic device 260. As the plunger 277 is caused to move out from the cylinder body of the second air cylinder 268, the movement of the plunger 277 will cause the manipulator arm 264 attached thereto to move in the downward direction (from the perspective of FIG. 5), thereby causing the free end 272 of the rod member 270 to also move in a downward direction away from the magnetic device 260. Conversely, as the plunger 277 is caused to move into the cylinder body of the second air cylinder 268, the movement of the plunger 277 will cause the manipulator arm 264 attached thereto to move in the upward direction (from the perspective of FIG. 5), thereby causing the free end 272 of the rod member 270 to move upward and toward the magnetic device 260.

The first and second air cylinders 266, 268 may be selectively actuated and controlled by the controller 221 of the cutter handling system 220 and/or the main control system 250 (FIG. 2).

After a cutting element 110 held by the magnetic device 260 has been positioned on or adjacent a body 102 of an earth-boring tool (e.g., in a cutting element pocket 112 (FIG. 1)), the first and second air cylinders 266, 268 may be selectively actuated to cause the free end 272 of the elongated rod member 270 to abut against a surface of the cutting element 110. As the robot 222 (FIGS. 3A, 3B, 4A and 4B) causes the cutter holding device 224 (and, hence, the magnetic device 260) to move away from the cutting element 110, the first and second air cylinders 266, 268 may be selectively actuated to cause the elongated rod 270 to hold the cutting element 110 in position relative to the body 102 until the magnetic device 260 is far enough away from the cutting element 110 that the magnetic fields of the magnetic device 260 will not cause the cutting element 110 to move out of position relative to the body 102. In other words, the elongated rod member 270 may be used to hold the cutting element 110 in place as the magnetic device 260 is pulled away from the cutting element 110.

Figure 6:
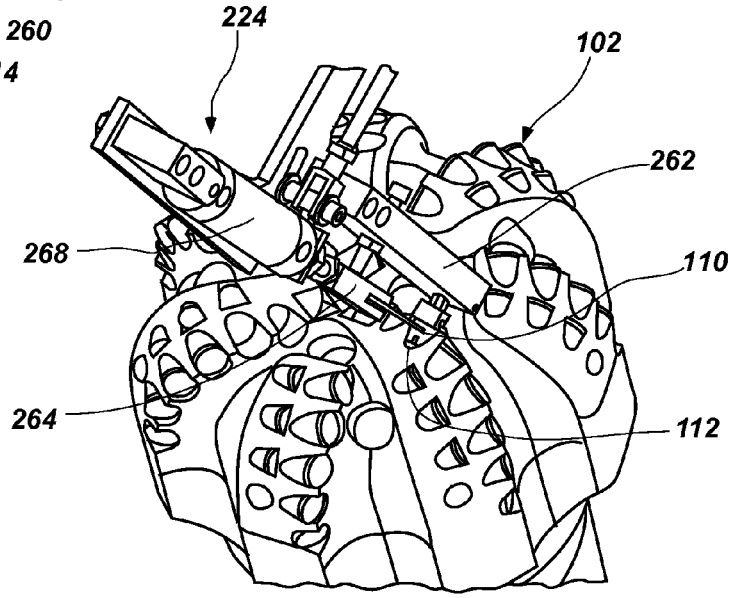
FIG. 6 is a perspective view illustrating the cutter holding device shown in FIG. 5 being used to position a cutting element in a cutting element pocket in a body of an earth-boring tool.

FIG. 6 is an enlarged partial view illustrating the cutter holding device 224, shown in FIG. 5, being used to position a cutting element 110 in a cutting element pocket 112 of the body 102 of an earth-boring rotary drill bit 110. In particular, FIG. 6 illustrates the free end 272 of the elongated rod member 270 of cutter holding device 224 holding a cutting element 110 in position within a cutting element pocket 112 as the magnetic device 260 (FIG. 5) and other components of the cutter holding device 224 are drawn away from the cutting element 110 by the robot 222 (FIGS. 3A, 3B, 4A, 4B, and 5).

Figure 7:
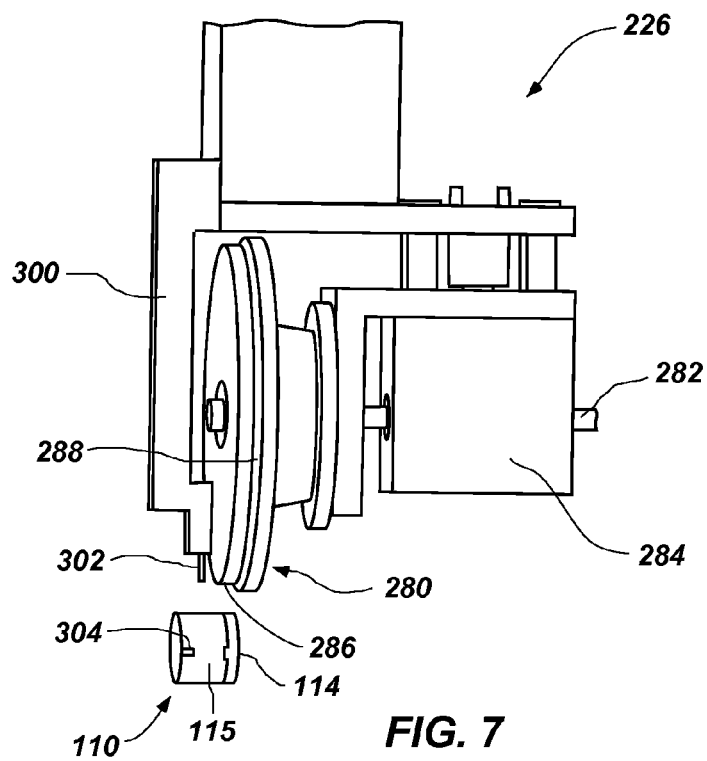
FIG. 7 is a perspective view of an embodiment of a power-driven device of the present invention that may be used in conjunction with embodiments of systems of the present invention, such as those represented in FIGS. 2, 3A, 3B, 4A, and 4B, to drive movement (e.g., rotation) of a cutting element disposed on or adjacent a body of an earth-boring tool.

FIG. 7 illustrates an embodiment of a power-driven device 226 of the present invention. As previously discussed, the power-driven device 226 may be carried by an end of the robot 222 and may be located thereon proximate the cutter handling device 224.

The power-driven device 226 shown in FIG. 7 includes a wheel 280 mounted on an axle 282. An electrical motor 284 is used to selectively drive rotation of the axle 282 and the wheel 280. A generally cylindrical lateral side surface 286 of the wheel 280 may be shaped and otherwise configured to abut against a surface of a cutting element 110 (such as, for example, a generally cylindrical lateral side surface 115 of a cutting element 110). In this configuration, the robot 222 may be used to cause the lateral side surface 286 of the wheel 280 to abut against a generally cylindrical lateral side surface 115 of a cutting element 110, and the electrical motor 284 may be used to drive rotation of the wheel 280 and, hence, the cutting element 110 abutting against the wheel 280.

As shown in FIG. 7, the wheel 280 may comprise a tapered surface 288, a ridge, or another feature on the side thereof to provide a surface against which a peripheral edge of a cutting face 114 of a cutting element 110 may abut when the wheel 280 is being used to drive rotation of the cutting element 110. In this manner, the tapered surface 288 may be used in an effort to prevent the cutting element 110 from sliding or "walking" out of a cutting element pocket 112 (FIG. 1) as the wheel 280 drives rotation of the cutting element 110 within the cutting element pocket 112.

The power-driven device 226 shown in FIG. 7 also may include a movable arm 300. In some embodiments, the movable arm 300 may be substantially similar to the manipulator aim 264 of FIG. 5, and may be selectively actuable in a manner substantially similar to the manipulator arm 264. The movable arm 300 may include a contact pin 302 or another sensor device on an end thereof, which may be used for determining a rotational position of a cutting element 110 within a cutting element pocket 112. For example, a line recess 304 may be inscribed or otherwise provided on a lateral side surface 115 of a cutting element 110, as shown in FIG. 7. As the wheel 280 drives rotation of the cutting element 110 within the cutting element pocket 112, the contact pin 302 may be caused to abut against the lateral side surface 115 of the cutting element 110. A sensor may be used to sense when the contact pin 302 is aligned with and disposed partially within the line recess 304 on the lateral side surface 115 of a cutting element 110. In some embodiments, the line recess 304 may be selectively placed on the lateral side surface 115 of the cutting element 110 such that the cutting element 110 is in a desired rotational orientation relative to the body 102 when the line recess 304 is aligned with the contact pin 302.

As a result, the contact pin 302 may be used to determine a rotational orientation of the cutting element 110 within a cutting element pocket 112 and/or to assist in orienting the cutting element 110 in a desirable rotational orientation within a cutting element pocket 112.

Figure 8:
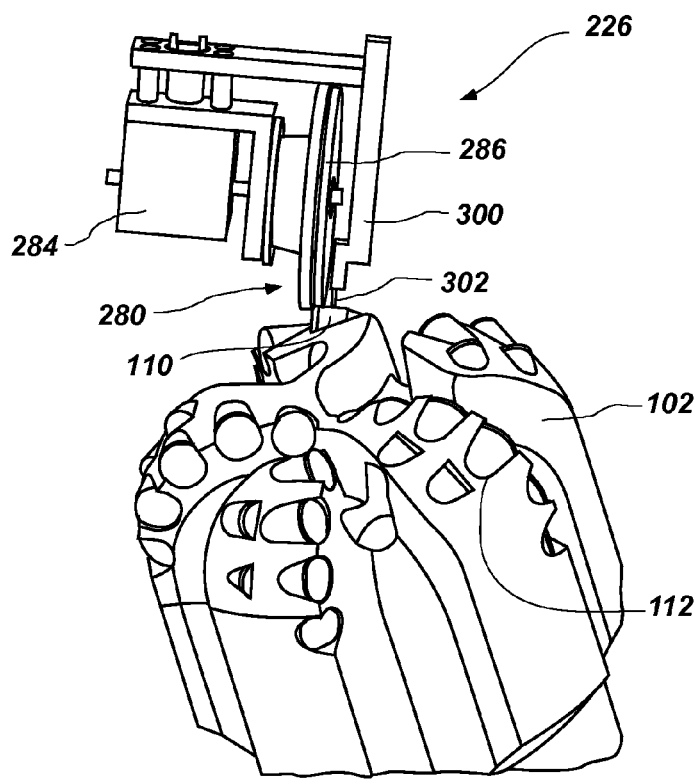
FIG. 8 is a perspective view illustrating the power-driven device shown in FIG. 7 being used to drive rotation of a cutting element in a cutting element pocket of a body of an earth-boring tool.

FIG. 8 is an enlarged partial view illustrating the power-driven device 226, shown in FIG. 7, being used to rotate a cutting element 110 in a cutting element pocket 112 of the body 102 of an earth-boring rotary drill bit 100 (FIG. 1). In particular, FIG. 8 illustrates the lateral side surface 286 of the wheel 280 abutting against a lateral side surface 115 of a cutting element 110 as the wheel 280 is being used to drive rotation of the cutting element 110.

Figure 9:
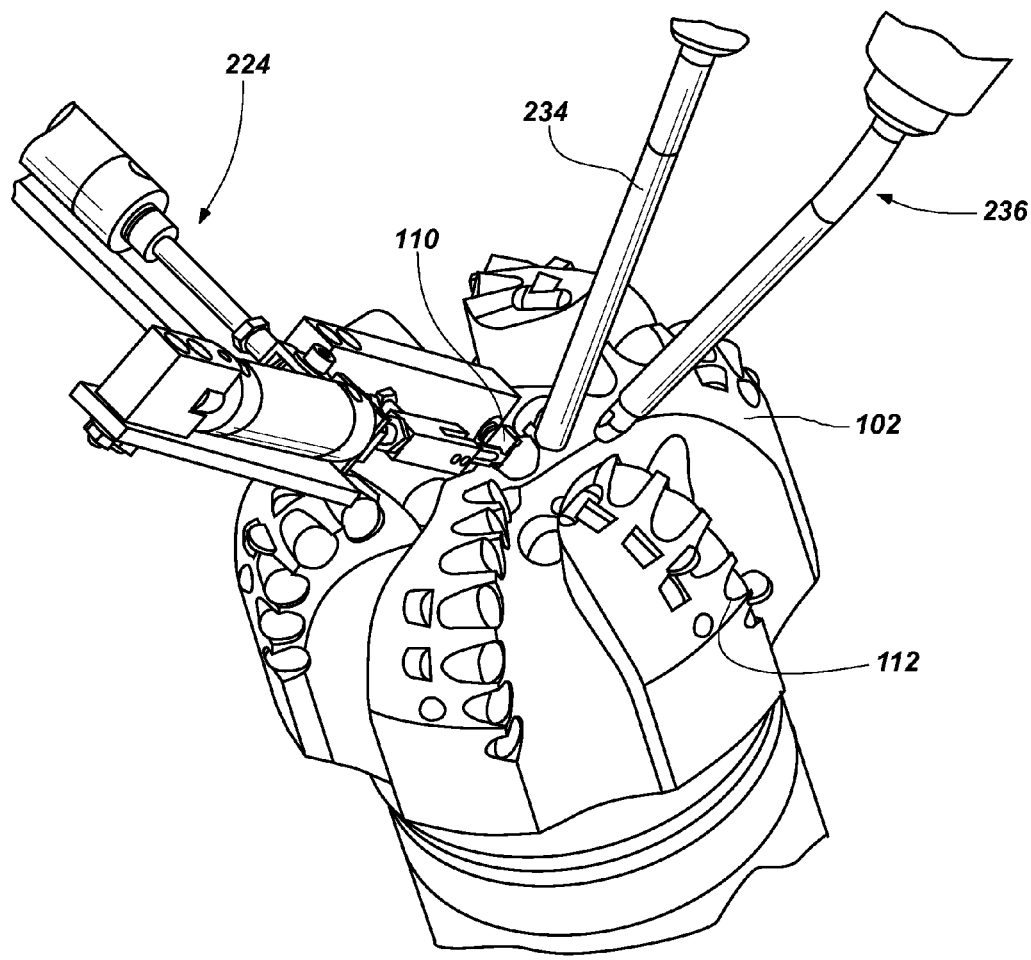
FIG. 9 is a partial perspective view illustrating the cutter holding device shown in FIG. 5 being used to position a cutting element in a cutting element pocket of a body of an earth-boring tool, and a portion of a cutting bonding system in position for bonding the cutting element to the body of the earth-boring tool.

FIG. 9 is an enlarged partial view illustrating the cutter holding device 224, shown in FIG. 5, being used to position a cutting element 110 in a cutting element pocket 112 of the body 102 of an earth-boring rotary drill bit 100 (FIG. 1). Also shown in FIG. 9 are a dispensing device 234 for dispensing bonding material and a torch 236 of a robotic cutter bonding systems 230. The dispensing device 234 shown in FIG. 9 includes a wire feeder device positioned and oriented to dispense wire bonding material onto an interface between a cutting element 110 and a surface of the body 102 of an earth-boring tool that defines a cutting element pocket 112 in which the cutting element 110 is disposed. The torch 236 shown in FIG. 9 includes an acetylene torch oriented and positioned to heat the cutting element 110, the region of the body 102 comprising the cutting element pocket 112, and the wire bonding material to be dispensed from the dispensing device 234.

Figure 10A:
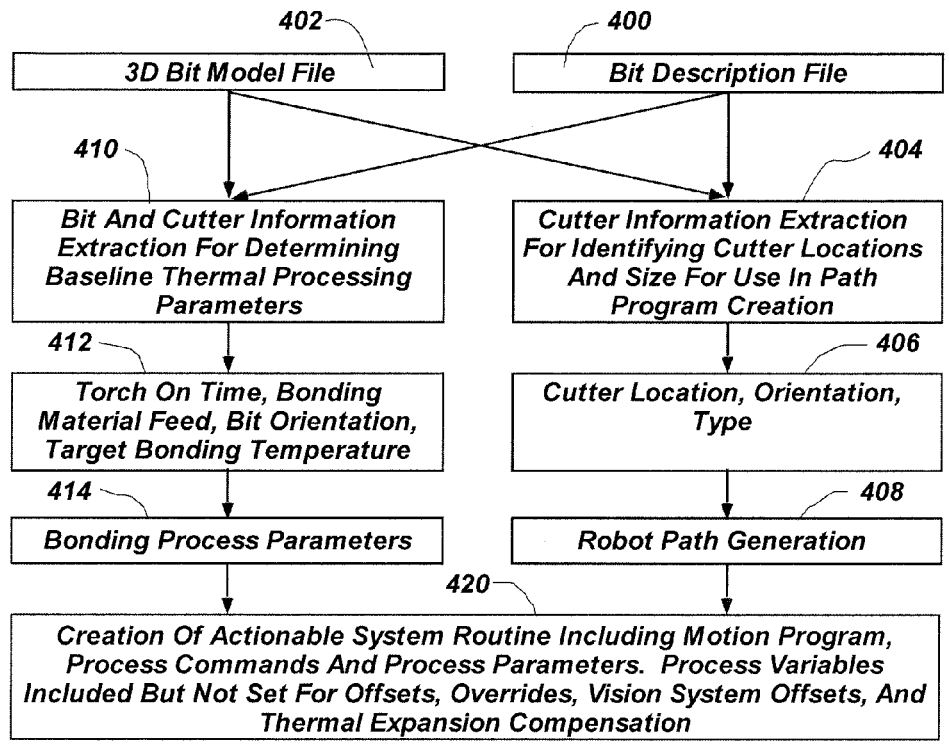
FIGS. 10A and 10B are flowcharts used for illustrating methods that may be used to generate a computer program for controlling systems like those shown in FIGS. 2, 3A, 3B, 4A, and 4B.
Figure 10B:
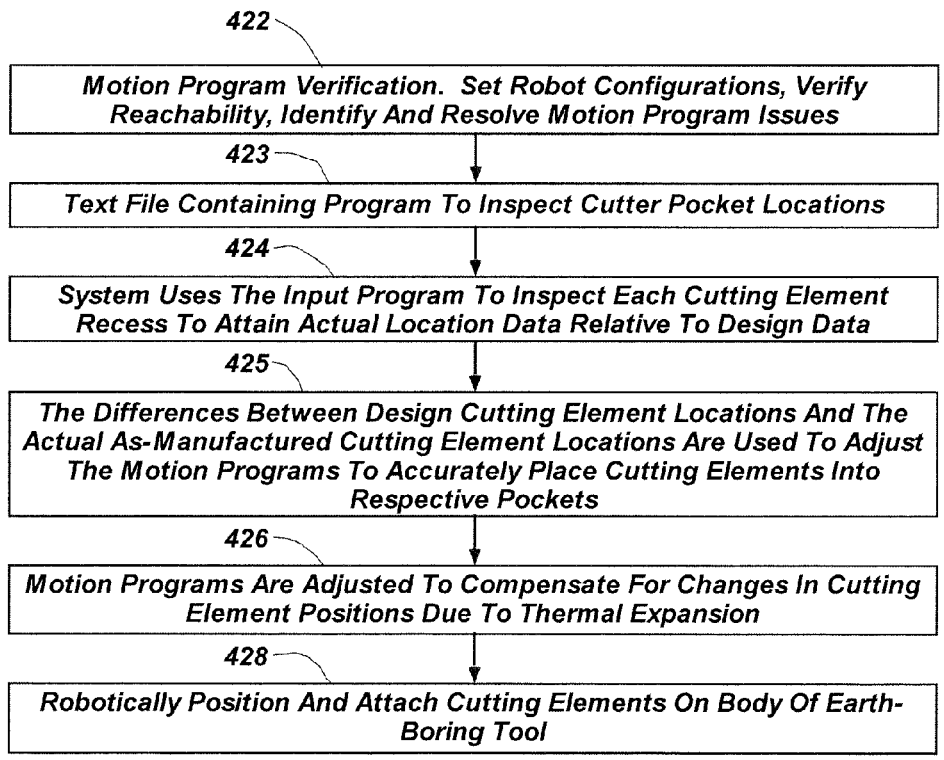

FIGS. 10A and 10B are a flowchart illustrating a method that may be used to create a computer program, or an actionable system routine including a plurality of individual programs, for controlling the cutting element attachment system 200 in accordance with embodiments of methods of the present invention. As shown in FIG. 10A, in act 400, a Bit Description File may be input into the control system 250. Similarly, in act 402, a three-dimensional (3D) Bit Model File (which may comprise a computer automated drawing (CAD) file) also may be input into the main control system 250.

In act 404, an algorithm or script may be executed by the main control system 250 to extract information from one or both of the Bit Description File and the 3D Bit Model File relating to the locations, orientations, and sizes of cutting elements 110 and/or cutting element pockets 112. The information extracted in act 404 may be written to a data file in act 406, which may be stored in the main control system 250. In act 408, an algorithm or script may be executed by the main control system 250 in which the data file generated in act 406 is used to generate motion programs that determine the paths to be followed by the positioner 212 of the robotic tool body handling system 210, the robot 222 of the robotic cutter handling system 220, and the robot 232 of the robotic cutter bonding system 230. As an example, a general tool path or motion program template may be used for a certain type or class of drill bit 100, and the data file generated in act 406 may be used to modify the motion program template to provide the paths to be followed by the positioner 212, the robot 222, and the robot 232 for a particular drill bit 100 or other tool to be processed using the cutting element attachment system 200.

With continued reference to FIG. 10A, in act 410, an algorithm or script may be executed by the main control system 250 to extract information from one or both of the Bit Description File and the 3D Bit Model File that may be used to determine processing parameters such as thermal processing parameters for the robotic cutter bonding system 230. For example, in act 410, an algorithm or script may be executed by the main control system 250 to extract information relating to the size, type, and material composition of cutting elements 110 and/or to the size, type, and material composition of the body 102 of the drill bit 100. In act 412, the information extracted in act 410 may be used to determine processing parameters, and the processing parameters may be written to a data file, which may be stored in the main control system 250. Such processing parameters may include, for example, the "on times" for the torch 236, bonding material feed rates and times for the dispensing device 234 for dispensing bonding material, orientation of the bit body 102, and a target temperature at which it is desirable for bonding to occur. In act 414, an algorithm or script may be executed by the main control system 250 in which the data file generated in act 412 is used to generate bonding process parameter programs that may be used to control the torch 236 and the dispensing device 234 for dispensing bonding material. Similar processes may also be used to generate programs for controlling other components of the cutting element attachment system 200 such as, for example, the cutter holding device 224 and the power-driven device 226 of the robotic cutter handling system 220.

In act 420, the main control system 250 may be used to create an actionable system routine that includes the various computer programs that will be used to synchronously control the various active components and systems of the cutting element attachment system 200, and to generate one or more data files defining the actionable system routine, and such data files may be stored in the main control system 250.

In some embodiments, acts 400 through 420 may be carried out using one or more computer systems separate from the main control system 250 or any other controller of the cutting element attachment system 200 shown in FIG. 2. In other embodiments, one or more of acts 400 through 420 may be carried out using the main control system 250 or another controller of the cutting element attachment system 200 shown in FIG. 2.

Referring to FIG. 10B, in act 422, the motion programs of the actionable system routine may be used to simulate movement of the various components of the cutting element attachment system 200 relative to the bit body 102 to verify that no physical interference problems will occur during a cutting element attachment process, and to ensure that the cutting element attachment process may be successfully carried out using the motion programs. Any potential problems may be identified, and the motion programs may be modified to resolve such problems prior to actual execution of the actionable system routine by the cutting element attachment system 200.

The actual positions and orientations of the cutting elements 110 and the cutting element pockets 112 of a drill bit 100 or tool may deviate somewhat from the intended positions and orientations of the cutting elements 110 and the cutting element pockets 112 of a drill bit 100 or tool due to inherent variations in the manufacturing processes used to form such drill bits 100 and tools. Therefore, in some embodiments of the present invention, one or more sensors 240 or sensor systems, as previously described herein, may be used to identify any differences between the actual positions and orientations of the cutting elements 110 and the cutting element pockets 112 of a drill bit 100 or tool and the intended positions and orientations of the cutting elements 110 and the cutting element pockets 112.

With continued reference to FIG. 10B, in act 423, the main control system 250 may generate one or more text files that include one or more computer programs for causing the one or more sensors 240 to inspect a bit body 102 carried by the positioner 212 to identify differences between the intended locations and orientations of the cutting element pockets 112.

In some embodiments, acts 422 and 423 may be carried out using one or more computer systems separate from the main control system 250 or any other controller of the cutting element attachment system 200 shown in FIG. 2. In other embodiments, one or more of acts 422 and 423 may be carried out using the main control system 250 or another controller of the cutting element attachment system 200 shown in FIG. 2.

In act 424, the main control system 250 may use these generated text files to cause the one or more sensors 240 (e.g., a vision system) to inspect a bit body 102 carried by the positioner 212 to identify differences between the intended locations and orientations of the cutting element pockets 112, as set forth in the design of the bit body 102, and the actual locations and orientations of the cutting element pockets 112 in the as-manufactured bit body 102. In act 425, the data or information acquired by the sensors 240 relating to the actual positions and orientations of the cutting element pockets 112 may be used to modify the motion programs that determine the paths to be followed by the positioner 212, the robot 222, and the robot 232 for a particular drill bit 100 or other tool to be processed using the cutting element attachment system 200.

The actual positions and orientations of the cutting element pockets 112 of a body 102 of a drill bit 100 or other tool also may change with changes in temperature due to thermal expansion and contraction. In some embodiments of the present invention, the bit body 102 may be preheated to a desirable temperature prior to attaching cutting elements 110 to the bit body 102. Furthermore, as the temperature of the body 102 is altered using the torch 236 of the robotic cutter bonding system 230, the positions and orientations of one or more cutting element pockets 112 may slightly change due to thermal expansion of the material of the body 102. As shown in FIG. 10B, in act 426, the main control system 250 may be used to modify the motion programs to compensate for changes in cutting element position due to thermal expansion. One or more sensors 240 or sensor systems, as previously described herein, may be used to determine and/or monitor a temperature of one or more of a bit body 102 and a cutting element 110. Once the temperature of one or more of a bit body 102 and a cutting element 110 is determined, changes in the actual positions and orientations of the cutting elements 110 and the cutting element pockets 112 of a drill bit 100 or tool due to variations in temperature may be calculated using known thermal expansion coefficients of the materials of the cutting elements 110 and the bit body 102. The calculated changes in the positions of the cutting element pockets 112 thus acquired may be used to determine or adjust the paths to be followed by the positioner 212 of the robotic tool body handling system 210, the robot 222 of the robotic cutter handling system 220, and the robot 232 in the motion programs.

As shown at act 428 in FIG. 10B, once the paths to be followed by the positioner 212 of the robotic tool body handling system 210, the robot 222 of the robotic cutter handling system 220, and the robot 232 of the robotic cutter bonding system 230 have been determined, the computer code of the actionable system routine may be executed in at least one of the main control system 250, the controller 214 of the robotic tool body handling system 210, the controller 221 of the robotic cutter handling system 220, and the controller 231 of the robotic cutter bonding system 230 to cause the positioner 212, the robot 222, and the robot 232 to at least substantially automatically perform their respective functions to attach one or more cutting elements 110 within the cutting element pockets 112 of the drill bit 100 or other tool.

Upon execution of the computer code of the actionable system routine, the robot 222 of the robotic cutter handling system 220, the robot robotic 232 of the cutter bonding system 230, and the positioner 212 of the robotic tool body handling system 210 may be indexed to a first position for attaching a cutting element 110 to the body 102 within a cutting element pocket 112. The robot 222 and cutter holding device 224 may be used to retrieve a cutting element 110 from a pre-loaded tray of cutting elements 110. The robot 232 and the torch 236 carried thereby may be used to heat the region of the body 102 comprising the cutting element pocket 112. Optionally, a flux material also may be applied to the cutting element pocket 112 using the robot 232. After the robot 232 and the torch 236 are used to heat the region of the body 102 comprising the cutting element pocket 112, the robot 222 and the cutter holding device 224 then may be used to position the cutting element 110 within the cutting element pocket 112. After positioning the cutting element 110 within the cutting element pocket 112, the power-driven device 226 carried by the robot 222 may be used to drive rotation of the cutting element 110 within the cutting element pocket 112 as the robot 232, the dispensing device 234 for dispensing bonding material, and the torch 236 are used to apply the bonding material to the interface between the cutting element 110 and the surfaces of the body 102 defining the cutting element pocket 112. The power-driven device 236 then may be used to rotate the cutting element 110 into a desirable rotational position within the cutting element pocket 112, prior to allowing the bonding material to solidify, cure, or otherwise fix the cutting element 110 in place within the cutting element pocket 112.

As the cutting element 110 is attached to the body 102 within the cutting element pocket 102, it may be desirable to maintain a temperature of the cutting element 110 below a temperature at which the cutting element 110 may be damaged. For example, if the cutting element 110 comprises a polycrystalline diamond compact (PDC) cutting element, it may be desirable to maintain the cutting element 110 at a temperature below about 750° C. to avoid damaging the cutting element 110. As a result, the sensors 240 may be used to monitor the actual temperature of the cutting element 110, and the heat output by the torch 236 may be controlled to maintain the temperature of the cutting element 110 below a predetermined threshold level.

The computer code of the actionable system routine may cause the cutting element attachment system 200 to repeat the above-described process for each of the cutting elements 110 to be attached to the body 102 of the earth-boring tool.

Embodiments of the present invention also may be used in the disassembly and/or repair of previously used drill bits 100 and other tools. For example, the cutting element attachment system 200 previously described herein could be programmed to at least substantially automatically remove cutting elements from a used drill bit 100. The robotic cutter bonding system 230 may be programmed to use the torch 236 thereof to apply heat to an interface between a cutting element 110 and an adjacent surface of a bit body 102 until a bonding material at the interface (e.g., a metal alloy braze material) melts or decomposes, and the robotic cutter handling system 220 may be programmed to then remove the cutting element 110 from the bit body 102. This process could be at least substantially automatically repeated for each of the cutting elements 110 of the drill bit 100. Optionally, the cutting element attachment system 200 could then be used to place new replacement cutting elements 110 in the cutting element pockets 112 of the drill bit 100 as part of a repair process. When used for repair, the cutting element attachment system 200 also may include automated equipment for machining (e.g., grinding, milling, drilling, etc.) the cutting element pockets 112 and other regions of the bit body 102 of a drill bit 100 as necessary or desirable during the machining process.

As the methods disclosed herein are at least partially automated, they may be conducted without a human operator being located in the immediate vicinity of the body 102 to which cutting elements 110 are being attached. As a result, the processes may be carried out in environments that would be harmful or dangerous to human operators. For example, embodiments of the systems disclosed herein may be positioned within an enclosed chamber or room, and the environment in the enclosed chamber or room may be controlled as embodiments of methods of the present invention are carried out using embodiments of systems of the present invention, as disclosed herein. Various aspects of the environment within such an enclosure may be controlled including, for example, the temperature within the enclosure, the pressure within the enclosure, and the composition of the gas or gases within the enclosure. For example, in some embodiments, the environment within such an enclosed chamber or room may be an oxygen-free environment, a reducing environment, or some other environment that would not be a suitable environment for a human operator, but would be beneficial when attaching a cutting element 110 to a body 102 of an earth-boring tool. In additional embodiments of the present invention, the methods disclosed herein may be carried out under controlled atmospheres, thereby allowing the use of certain bonding materials that could not easily be used in previously known processes in which cutting elements 110 were manually attached to a body of an earth-boring tool.

While the embodiments of the present invention are described herein in relation to earth-boring rotary drill bits having fixed cutters and to methods for forming such drill bits, embodiments of the present invention also may be used to form other types of earth-boring tools such as, for example, reamers, mills, and so-called "hybrid bits" that include both one or more roller cones in combination with fixed cutters carried on blades or other supporting structures. Thus, as employed herein, the term "drill bit" includes and encompasses all of the foregoing earth-boring tools, as well as components and subcomponents of such structures.

While the present invention has been described herein with respect to certain embodiments, those of ordinary skill in the art will recognize and appreciate that it is not so limited. Rather, many additions, deletions and modifications to the embodiments described herein may be made without departing from the scope of the invention as hereinafter claimed. In addition, features from one embodiment may be combined with features of another embodiment while still being encompassed within the scope of the invention as contemplated by the inventor.

What is claimed is:

1. A method of attaching a cutting element to an earth-boring tool, comprising:
    robotically positioning at least one cutting element at least partially within a cutting element pocket defined by at least one surface of a body of an earth-boring tool; and
    robotically applying a bonding material to at least one of the at least one cutting element and the at least one surface of the body of the earth-boring tool defining the cutting element pocket.

2. The method of claim 1, further comprising using a power-driven device to move the at least one cutting element within the cutting element pocket.

3. The method of claim 1, wherein robotically applying the bonding material comprises:
    moving a torch and a device for dispensing bonding material in three-dimensional space using at least one robotic arm;
    dispensing bonding material from the device for dispensing bonding material onto the at least one of the at least one cutting element and the at least one surface of the body of the earth-boring tool defining the cutting element pocket; and
    heating the bonding material dispensed from the device for dispensing bonding material using the torch.

4. The method of claim 3, further comprising:
    mounting the torch to an end of the at least one robotic arm; and
    mounting the device for dispensing bonding material to the end of the at least one robotic arm.

5. A method of attaching a cutting element to an earth-boring tool, comprising:
    positioning at least one cutting element at least partially within a cutting element pocket defined by at least one surface of a body of an earth-boring tool; and
    robotically applying a bonding material to at least one of the at least one cutting element and the at least one surface of the body of the earth-boring tool defining the cutting element pocket.

6. A system for orienting a cutting element relative to an earth-boring tool, comprising:
    a device configured to hold a body of an earth-boring tool; and
    a power-driven device configured to move a cutting element, the cutting element configured to be bonded to the earth-boring tool, the cutting element positioned within a cutting element pocket defined by at least one surface of the body of an earth-boring tool when a movable surface of the power-driven device is abutted against the cutting element and the power-driven device is used to move the movable surface relative to the cutting element.

7. The system of claim 6, further comprising a control system configured under control of a computer program to control at least one of the power-driven device and the device configured to hold a body of an earth-boring tool.

8. The system of claim 7, wherein the device configured to hold a body of an earth-boring tool comprises a robotic positioner.

9. The system of claim 7, wherein the control system is configured under control of the computer program to control each of the power-driven device and the device configured to hold a body of an earth-boring tool.

10. The system of claim 6, wherein the power-driven device comprises at least one of an electrical motor, a pneumatic motor, and a hydraulic motor.

11. The system of claim 6, wherein the movable surface of the power-driven device comprises a surface of at least one of a wheel and a belt.

12. The system of claim 6, wherein the power-driven device is carried by a robot.

13. The system of claim 12, wherein the robot comprises an articulated robotic arm configured to move the power-driven device in three-dimensional space about three or more axes of movement.

14. A method of attaching a cutting element to an earth-boring tool, comprising:
    at least substantially enclosing a body of an earth-boring tool in a chamber;

controlling an environment within the chamber; and at least substantially automatically applying a bonding material to at least one of a cutting element and a surface of the body of the earth-boring tool defining at least one cutting element pocket while the body of the earth-boring tool is in the controlled environment within the chamber.

15. The method of claim 14, further comprising robotically positioning at least one cutting element at least partially within the cutting element pocket defined by the at least one surface of the body of the earth-boring tool.

16. The method of claim 14, further comprising:

abutting a movable surface of a power-driven device against a surface of the at least one cutting element; and moving the movable surface of the power-driven device to cause the at least one cutting element to move within the cutting element pocket.

* * * * *